3,365,300
FLOUR COMPOSITIONS AND BAKED PRODUCTS WITH SODIUM, POTASSIUM AND CALCIUM SALTS OF N-ALKANOYLGLYCINES AND ALANINES INCLUDED THEREIN
Paul D. Thomas, Groton, Conn., assignor to Chas. Pfizer & Co., New York, N.Y., a corporation of Delaware
No Drawing. Filed Jan. 13, 1965, Ser. No. 425,345
6 Claims. (Cl. 99—91)

ABSTRACT OF THE DISCLOSURE

Sodium, potassium and calcium salts of N-alkanoylglycines and alanines containing from 14 to 20 carbon atoms in the alkanoyl group, incorporated in a farinaceous composition in an amount of at least 0.1%, based on the weight of flour employed in composition.

---

The invention described in this application relates to certain novel flour or farinaceous compositions. More particularly, it is concerned with various N-acyl amino acid derivatives which have been found to be of value in the food industry when used in conjunction with flour. The invention includes the use of these compounds as well as the flour compositions containing them within its scope.

In the baking art, natural variations in flour characteristics have been the source of a continuous problem or obstacle to the workers in this field even when flours of the highest quality grade are carefully selected. Long a problem in conventional baking, this matter has now been further accentuated in continuous bread processing. In accordance with the present invention, on the other hand, the compounds disclosed and used herein help to even out variations in flour characteristics in view of the marked dough strengthening properties which they exhibit. As a result, greater tolerances are now provided in the mixing, fermenting and machining operations, causing a baked product to be obtained with improved grain and texture as well as over-all quality. In addition, the rate of crumb firming is retarded and there is also no need to use such starch emulsifiers as mono-diglycerides and calcium stearyl-2-lactylate, etc.

The compounds which are included within the purview of this invention are all selected from the class consisting of N-acyl amino acid salts of the formulae:

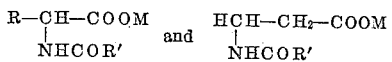

and wherein R is a member selected from the group consisting of hydrogen and methyl, M is a metallic cation selected from the group consisting of sodium, potassium and calcium, and R' is an alkyl radical of from thirteen to nineteen carbon atoms. Typical member compounds of this series include sodium N-stearoyl-DL-α-alanine, sodium N - stearoyl - β - alanine, sodium N - palmitoyl - DL - α - alanine, potassium N - palmitoyl - β - alanine, calcium N - myristoyl - DL - α - alanine, calcium N-arachidoyl - DL - α - alanine, sodium N - stearoylglycine, sodium N-palmitoylglycine, and so on. All these compounds are useful as bread softening agents in view of their ability to retard the firming, i.e., the staling rate, of bread when incorporated into the dough of the baking mix prior to baking.

The process employed for preparing the useful compounds of this invention involves first treating the appropriate amino acid starting material with the desired higher alkanoyl halide of choice in accordance with conventional organic procedure, and then subsequently converting the N-alkanoyl amino acid so formed to the corresponding alkali metal or calcium salt thereof with either sodium, potassium or calcium hydroxide, as the case may be. Actually, many of the N-alkanoyl amino acid intermediates of this invention are known compounds and have already been reported in the literature. For instance, N-palmitoylalanine has been prepared by M. Naudet (Bull. Soc. Chim., France, 1950, pp. 358–361) starting from alanine and palmitoyl chloride, and using aqueous sodium hydroxide as the reaction medium therefor. However, the utility reported therein for such a compound was that of a good detergent agent and not that of a bread softening agent. Additionally, Fieser et al., in the Journal of the American Chemical Society, vol. 78, p. 2825 (1956), report on the preparation of N-stearoyl-DL-α-alanine by a different method, starting from alanine ethyl ester hydrochloride and proceeding to the ethyl ester of N-stearoyl-DL-α-alanine via stearic acid in the presence of triethylamine and isobutyl chlorocarbonate.

In connection with a more detailed consideration of the preferred method of synthesis for these compounds, i.e., the N-alkanoyl amino acid salts having the aforementioned bread softening properties, the corresponding N-alkanoylglycine or alanine having from 14 to 20 carbon atoms in the alkanoyl group is contacted with either sodium, potassium or calcium hydroxide, as the case may be, in accordance with conventional procedure in an aqueous organic solvent system. In practice, it is preferable to employ an aqueous alcoholic or aqueous acetone solutions of the N-alkanoyl amino acid compound containing an equivalent amount in moles of the appropriate metal hydroxide. The desired salt soon precipitates from solution almost immediately upon completion of this step. Other solvents which may be used here in place of acetone include other lower alkyl ketones such as methyl ethyl ketone, diethyl ketone, methyl isoamyl ketone, and the like, while suitable alcohol solvents include such lower alkanols as methanol, ethanol, isopropanol, tertiary-butanol, and so on. The calcium N-alkanoyl glycines and alanines of this invention may, alternatively, also be prepared from the corresponding monoalkali compounds thus formed, by means of a simple metathetical reaction involving the use of a calcium halide salt, such as calcium chloride or bromide, in an aqueous system to afford the desired calcium compound useful as a bread softener.

As previously indicated, the compounds of this invention are all useful as bread softening agents to prevent staling, in addition to being useful for improving the condition of the dough as well. In carrying out the baking process proper, only minor proportionate amounts of the instantly claimed compounds need be used in the dough batch or baking mix in order to achieve effective results in this connection. For instance, concentrations as low as 0.1% by weight of the compound, based on the weight of the flour, have been found to be effective and, in general, one need only employ these compounds at levels that are in the range of from about 0.1% up to about 3% by weight of the softening agent in order for highly satisfactory results to be achieved. Moreover, the sodium, potassium and calcium salts of the N-alkanoyl amino acids of this invention accomplish their useful firmness-retarding activity in bread without causing any adverse side effects to occur, i.e., they do not adversely affect the crumb size, grain, crust, color, texture, specific volume of flavor of the finished bread products when the latter are baked under normal, standard conditions. The bread-softening activity of these compounds is also surprising when one considers that the corresponding N-alkanoyl amino acids from which they are derived lack this activity to a substantial degree.

Additionally, the compounds of this invention impart improved qualities in general, including anti-staling properties, to such baked products as rolls, doughnuts, biscuits, cakes, pastries and the like, as well as bread, when added to the dough in the quantities previously indicated. For instance, among the specific advantages which have been realized by their use in this manner with respect to the yeast-leavened products are: (1) retardation of crumb firming; (2) improved dough handling characteristics; (3) improved ingredient and processing tolerances; (4) reduction in proof time; and (5) improved physical characteristics, such as the grain, texture and volume of the finished baked goods. Furthermore, chemically-leavened baked products also benefit equally as well by the use of these compounds in the baking dough or batter prior to baking in the same manner as before. Thus, for example, improved batter and/or dough handling characteristics have resulted, as well as improved finished goods properties and firmness development with respect to the crumb quality. In almost every case, the most outstanding compound of all those tested and the one which is, therefore, the most preferred member of this invention is sodium N-stearoyl-DL-α-alanine.

Moreover, the compounds of the present invention are useful in farinaceous starch products in the food field in general. For instance, they have been found to impart improved properties to the quality and texture of such products as grain cereals, macaroni and the like, if said products are first treated with these compounds just prior to cooking. The advantages afforded by the use of these compounds in this manner, i.e., as applied to starch-based foods, are manifold: for instance, they prevent undesirable stickiness and pastiness from occurring in said products, thereby resulting in increased production advantages as well as in increased consumer appeal of the finished product. Examples of practical illustrations of the present invention include the use of these compounds in such starch-based foods as instant potato flakes or granules, macaroni products and spaghetti, hot breakfast food cereals, and the like, and starch-based pie-fillings and dessert puddings, as well as in dehydrated creamed soups and various rice products, etc. In each case, the starch-containing product is improved as to both its quality and texture in view of the ability of these compounds to reduce the inherent stickiness and pastiness of the starch-containing food material as previously indicated.

In accordance with the process of this invention for effecting said improvement in starch-based foods, a starch-containing or starch-based food material is first treated with a relatively minor amount of the organic compound heretofore mentioned just prior to the cooking step. In general, all that is usually necessary is to use at least about 0.1% by weight of the compound based on the total weight of the starch-based food material. In some instances, even less than this amount may be effective, but it is generally not advisable to go below the aforementioned lower limit. The upper limit can be preferably set at about 3% although this is not really critical and amounts as high as 5% by weight have been used. Nevertheless, there is no real appreciable advantage to be gained in exceeding the aforementioned 3% weight limit. The important point to remember is that the addition and subsequent mixing steps must be accomplished prior to the cooking of the starch-based food material. Of especial interest in this connection is the fact that sodium N-stearoyl-DL-α-alanine is particularly valuable as an agent for improving the quality and texture of macaroni products. For instance, this compound is reported to increase the firmness of the food product itself, as well as to improve its tolerance to overcooking and to prevent clinging and stickiness of the individual noodle strands from occurring. These improved properties of the finished food material are of especial value in those cases where the macaroni product is intended for use in the canning industries and in the institutional trades, such as in mass feeding establishments, etc.

In summary, therefore, the present invention is concerned with farinaceous compositions comprising flour and at least about 0.1% by weight based on said flour of a compound selected from the group consisting of the sodium, potassium and calcium salts of N-alkanoyl glycines and alanines containing from 14 to 20 carbon atoms in the alkanoyl group. More particularly, it is concerned with farinaceous compositions comprising the flour and from between about 0.1 to about 3% by weight based on said flour of a compound of the type as hereinbefore described. The preferred compounds for these food compositions are the N-alkanoylalanines of from 16 to 18 carbon atoms in the alkanoyl group and especially, sodium N-stearoyl-DL-α-alanine, sodium N-stearoyl-β-alanine and sodium N-palmitoyl-DL-α-alanine. The flour present in these compositions can preferably be a wheat flour of either the bleached or unbleached variety and it is normally present in intimate admixture with the compound of choice. Needless to say, the baked leavened dough products so produced from these compositions also lie within the scope of this invention, as do aqueous farinaceous compositons containing these compounds at the aforementioned weight levels.

Moreover, the invention also includes within its scope the method of improving the properties of aqueous farinaceous dispersions, which comprises the step of incorporating therein at least about 0.1% by weight, based on the weight of the flour, of the compound heretofore mentioned, i.e., one selected from the group consisting of the sodium, potassium and calcium salts of N-alkanoyl glycines and alanines containing from 14 to 20 carbon atoms in the alkanoyl group. More particularly, it is concerned with the method of retarding the staling rate of various baked leavened dough products. This is accomplished by incorporating the compounds of the present invention in said compositions at concentration levels ranging from between about 0.1 to about 3% by weight, based on the weight of the flour contained in said dough. As previously indicated, the preferred compounds for these edible starch compositions are the N-alkanoylalanine salts containing from 16 to 18 carbon atoms in the alkanoyl group.

This invention is further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

In a 2-liter, four-necked flask fitted with stirrer, thermometer, dropping funnel, nitrogen-inlet tube and reflux condenser having drying tube attached at the top, there were placed 180 g. (2.0 moles) of DL-α-alanine suspended in 500 ml. of 1,2-dimethoxyethane. The resulting slurry was then heated under a nitrogen atmosphere to reflux temperatures (85–86° C.), while 303 g. (1.0 mole) of stearoyl chloride was added to the mixture from the dropping funnel over a twenty-minute period. At the end of this time, the reaction mixture was refluxed for seven hours and then subjected to vacuum distillation to remove the solvent. The residual material was then taken up in 1000 ml. of warm chloroform and washed with three-200 ml. portions of cold water. Upon evaporation of the washed chloroform layer to dryness while under reduced pressure, there was obtained 355 g. of a yellow oil which soon solidified to a cream-colored solid on standing. This amounted to a 47% yield of N-stearoyl-DL-α-alanine, M.P. 114–117° C.

*Analysis.*—Calcd. for $C_{21}H_{41}NO$: acid value, 158. Found: acid value, 155.

EXAMPLE II

The procedure described in Example I is repeated exactly to prepare N-stearoyl-β-alanine by merely substituting the same amount of β-alanine in place of DL-α-alanine as starting material for this reaction.

In like manner, the use of glycine on an equivalent weight basis in place of DL-α-alanine in this same reaction affords N-stearoylglycine as the desired product.

EXAMPLE III

The procedure described in Example I is followed to prepare N-palmitoyl-DL-α-alanine starting from this amino acid, but using palmitoyl chloride in place of stearoyl chloride on an equivalent weight basis.

EXAMPLE IV

The procedure described in Example I is followed to prepare the following N-acyl amino acid compounds, starting from the appropriate molar amounts of amino acid and corresponding acyl chloride reagent in each case:

N-palmitoyl-β-alanine
N-palmitoylglycine
N-myristoyl-DL-α-alanine
N-myristoyl-β-alanine
N-myristoylglycine
N-arachidoyl-DL-α-alanine
N-arachidoyl-β-alanine
N-arachidoylglycine

EXAMPLE V

To a solution of 50 g. (0.141 mole) of N-stearoyl-DL-α-alanine dissolved in 300 ml. of ethanol, there were added 5.8 g. (0.141 mole) of sodium hydroxide in 10 ml. of water and 20 ml. of ethanol. The basic aqueous alcohol solution was added to the organic solution very slowly with constant agitation being employed throughout this step. The precipitated salt which formed was then removed by means of filtration, washed with fresh ethanol and dried in vacuo at 40° C. to afford a 36.6 g. (93%) yield of sodium N-stearoyl-DL-α-alanine.

EXAMPLE VI

The procedure described in Example V is followed to prepare other sodium salts, viz., the salts of those acids previously reported in Examples II–IV. In each and every case, equimolar quantities of reactant and reagent are employed as in Example V. In this manner, the following compounds are obtained:

sodium N-stearoyl-β-alanine
sodium N-stearoylglycine
sodium N-palmitoyl-DL-α-alanine
sodium N-palmitoyl-β-alanine
sodium N-palmitoylglycine
sodium N-myristoyl-DL-α-alanine
sodium N-myristoyl-β-alanine
sodium N-myristoylglycine
sodium N-arachidoyl-DL-α-alanine
sodium N-arachidoyl-β-alanine
sodium N-arachidoylglycine

EXAMPLE VII

The procedure described in Example V is followed to prepare the potassium salts of the acids previously reported in Examples I–IV. This is accomplished by employing potassium hydroxide in place of sodium hydroxide on an equivalent molar basis in this reaction. The compounds obtained in this manner are listed below as follows:

potassium N-stearoyl-DL-α-alanine
potassium N-stearoyl-β-alanine
potassium N-stearoylglycine
potassium N-palmitoyl-DL-α-alanine
potassium N-palmitoyl-β-alanine
potassium N-palmitoylglycine
potassium N-myristoyl-β-alanine
potassium N-myristoyl-β-alanine
potassium N-myristoylglycine
potassium N-arachidoyl-DL-α-alanine
potassium N-arachidoyl-β-alanine
potassium N-arachidoylglycine

EXAMPLE VIII

The procedure described in Example V is followed to prepare the calcium salts of the acids previously reported in Examples I–IV. This is accomplished by employing calcium hydroxide in place of sodium hydroxide on an equivalent molar basis in this reaction. The compounds obtained in this manner are listed below as follows:

calcium N-stearoyl-DL-α-alanine
calcium N-stearoyl-β-alanine
calcium N-stearoylglycine
calcium N-palmitopl-DL-α-alanine
calcium N-palmitoyl-β-alanine
calcium N-palmitoylglycine
calcium N-myristoyl-DL-α-alanine
calcium N-myristoyl-β-alanine
calcium N-myristoylglycine
calcium N-arachidoyl-DL-α-alanine
calcium N-arachidoyl-β-alanine
calcium N-arachidoylglycine

EXAMPLE IX

Sodium N-stearoyl-DL-α-alanine, prepared as described in Example V, was incorporated into a bread recipe having the following formula:

*4-hour sponge*

| | Grams |
|---|---|
| Flour | 1120 |
| Water | 615 |
| Yeast | 40 |
| Dough conditioner [1] | 8 |

[1] Potassium bromate, 0.3%; ammonium chloride, 9.7%; calcium sulfate, 25%; sodium chloride, 10%; and starch, 55%.

*Dough portion*

| | Grams |
|---|---|
| Flour | 480 |
| Water | 417 |
| Sugar (granulated) | 128 |
| Salt | 34 |
| Calcium propionate | 6 |
| Milk powder | 48 |
| Lard | 40 |
| Sodium N-stearoyl-DL-α-alanine | 8 |

The ingredients of the sponge recipe are added to the McDuffee bowl of a Hobart mixer in the order listed. The ingredients are mixed for one minute using the No. 1 speed. The bowl is then scraped down and the sponge is again mixed for one minute at the No. 2 speed. The sponge is removed from the bowl at this point and transferred to a polyethylene bag and allowed to ferment at room temperature (~25° C.) for four hours.

A sponge separately prepared as described in the above section is then placed in a ten quart stainless-steel Hobart mixing bowl and the balance of the ingredients are added as outlined under the dough portion of the bread recipe. The mixture is mixed on No. 1 speed for eight minutes. The resultant dough is then removed from the bowl and placed in a polyethylene bag and allowed to ferment for 24 minutes at room temperature (~25° C.). It is then scaled into 1 lb. portions, with at least four 1-lb. balls of dough being prepared for the subsequent testing. The balls are rounded (rolled into small balls by hand in order to exclude large air bubbles and gas pockets), and each ball is then run through the molder twice using a 5/16 inch setting for the first pass and 3/16 setting for the second. The molded dough is rolled into a cylinder approximately as long as the pan in which it is baked. The cylinder is tightened by placing in the automatic rollers to fit bread pan length between the ends. It is then dropped into greased bread pans, transferred to the proof box and proofed for one hour at 120° F. and 55% relative humidity. The proofed dough is baked at 430° F. for 25 minutes and the resulting bread allowed to cool for one hour. This bread contained the sodium N-stearoyl-DL-$\alpha$-alanine additive at the 0.270% concentration level, based on the total weight of the dough, which amounted to roughly 0.5% based on the flour. Three of the four bread loaves obtained are then packaged into polyethylene bags, and these packaged loaves are stored at room temperature and the compression data determined thereon at the end of 3, 4 and 5 days of storage time, respectively. Each of the unpackaged loaves, on the other hand, is sliced and compression data determinations are performed immediately thereon so as to provide "initial" data readings.

The compression determinations on each loaf are conducted on two-1 inch thick slices of bread, one slice being taken from the center of the bread and the other approximately one inch from the end. The compression test is performed with a standard penetrometer using a 1-inch diameter flat stainless-steel disc in place of the usual vaseline cone. A 150 g. weight is used as the load on the end of the compression disc. The load is placed on the slice for a period of five seconds, after which time the penetration is determined in millimeters. Three compressions are performed on each slice of bread, two in the bottom corners of the slice and the third at the top center. All data is recorded and the six values for each loaf are averaged. The results obtained in this manner at the concentration level tested (based on flour weight) are presented below in the following table, which also includes corresponding information on the monodiglyceride additive of commerce (Atmul 500), as well as a negative control (where there is an additive present) for comparison purposes:

| Additive | Initial | Compression Data (mm.) | | |
|---|---|---|---|---|
| | | 3 days | 4 days | 5 days |
| None (control) | 189 | 50 | 38 | 29 |
| Monodiglyceride [1] | 182 | 70 | 60 | |
| Na N-stearoyl-DL-$\alpha$-alanine | 189 | 88 | 69 | 57 |

[1] Atmul 500, which is the registered trademark name of Atlas Chemical Industries for a mixture consisting of 56% monoglycerides and 35% diglycerides.

From the data presented in the above table, it can be seen that *sodium* N-stearoyl-DL-$\alpha$-alanine was found to be superior as a bread softening agent not only to the control, but also to the monodiglyceride of commerce as well.

EXAMPLE X

The procedure described in Example IX was followed here except that sodium N-stearoyl-$\beta$-alanine, prepared as described in Example VI, was now employed as the softening agent of choice in place of sodium N-stearoyl-DL-$\alpha$-alanine at the same concentration level as used in the previous experiment. The results obtained in this manner are summarized below in the following table, which also includes the same control data as in Example IX for comparison purpose:

| Additive | Initial | Compression Data (mm.) | | |
|---|---|---|---|---|
| | | 3 days | 4 days | 6 days |
| None (control) | 189 | 50 | 38 | |
| Monodiglyceride | 182 | 70 | 60 | 30 |
| Na N-stearoyl-$\beta$-alanine | 184 | 65 | 59 | 28 |

As in the previous example, it can be seen that the instant softening agent of choice is superior to the control. Further, sodium N-stearoyl-$\beta$-alanine was also found to be equally as good as the monodiglyceride of commerce.

EXAMPLE XI

The procedure described in Example IX is followed employing in place of sodium N-stearoyl-DL-$\alpha$-alanine as the softening agent of choice any one of the other products reported previously in Examples VI–VIII. In each and every case, the results obtained are substantially the same as those reported previously in the preceding two examples for sodium N-stearoyl-DL-$\alpha$-alanine and sodium N-stearoyl-$\beta$-alanine, respectively.

Additionally, this same procedure is also repeated using the compounds of choice at different concentration levels other than that previously reported on, i.e., 0.5%. For instance, when sodium N-stearoyl-DL-$\alpha$-alanine is employed at the 0.1% concentration level, based on the weight of the flour, the results obtained are substantially the same as those previously indicated. In like manner, the use of 3.0% sodium N-palmitoylglycine also affords similar results.

EXAMPLE XII

The procedure described in Example IX was repeated as regards the preparation of the conventional sponge and dough formulation, including the added sodium N-stearoyl-DL-$\alpha$-alanine at the 0.5% concentration level, based on flour weight. However, in this particular case, the dough improver effects of the aforementioned alanine compound were investigated and breads were prepared using the optimum mixing time of 3¼ minutes, as well as severe overmix conditions of 7.5 minutes. Observations were then made on dough quality and on the quality of the finished goods, employing a negative control for comparison purposes. In these tests, three loaves of bread were baked for each test sample or control at a given mixing time for the dough (dough mixing time or DMT, in minutes), and the results obtained were thereafter averaged. The following table summarizes the representative data so obtained under these conditions, using a good quality bread flour (⅓ Montana, ⅔ Kansas Spring—65% absorption) for all the baking studies reported below:

| Additive | DMT (min.) | Loaf Wght. (gm.) | Loaf Vol. (cc.) | Sp. Vol., cc./gm. | Bread Appearance and Dough Effects |
|---|---|---|---|---|---|
| None (control) | 3.25 | 398 | 2,260 | 5.68 | Fair crumb and good color. |
| Na N-stearoyl-DL-$\alpha$-alanine | 3.25 | 398 | 2,320 | 5.83 | Good crumb and good color. |
| None (control) | 7.5 | 405 | 2,090 | 5.16 | Poor crumb and fair color; dough v. sticky and runny at makeup. |
| Na N-stearoyl-$\alpha$-alanine | 7.5 | 401 | 2,190 | 5.46 | Fair silky crumb and good color; not sticky and runny at makeup. |

From the above table, it is obvious that sodium N-stearoyl-DL-$\alpha$-alanine is consistently superior to the negative control, where there is no additive present, as regards both the grain and over-all bread quality. Further, the dough produced on overmixing in the case of the instant N-stearoyl alanine composition is stronger and substantially less sticky and runny in appearance on make-up.

EXAMPLE XIII

The procedure described in Example XII was followed except that this time sodium N-stearoyl-$\beta$-alanine was used in place of the corresponding α-isomer on the same weight basis as before. The results obtained in this manner are summarized below in the following table:

| Additive | DMT (min.) | Loaf Wght. (gm.) | Loaf Vol. (cc.) | Sp. Vol., cc./gm. | Bread Appearance and Dough Effects |
|---|---|---|---|---|---|
| None (control) | 3.25 | 398 | 2,260 | 5.68 | Fair crumb and good color. |
| Na N-stearoyl-β-alanine | 3.25 | 399 | 2,260 | 5.66 | Good crumb and good color. |
| None (control) | 7.5 | 405 | 2,090 | 5.16 | Poor crumb and fair color; dough v. sticky and runny. |
| Na N-stearoyl-β-alanine | 7.5 | 401 | 2,140 | 5.34 | Fair silky crumb and color; not sticky and runny at makeup. |

EXAMPLE XIV

The procedure described in Example XII is repeated again using the other N-acyl amino acid salts reported previously in Examples VI–VIII. In each and every case, the results obtained showed that the other compounds of this invention work substantially as well as dough improving agents when used in this manner as compared to the aforementioned sodium N-stearoylalanines.

Additionally, the same procedure is also repeated using the compounds of choice at different concentration levels other than that previously employed. For instance, when sodium N-stearoyl-DL-α-alanine is employed at the 0.1% concentration level, based on the weight of the flour, the results obtained are substantially the same as those previously reported. In like manner, the use of 3.0% sodium N-palmitoyl-β-alanine also affords similar results.

EXAMPLE XV

A high-sugar white cake is prepared in the following manner from the ingredients listed below:

|  | Grams |
|---|---|
| Cake flour | 219 |
| Sugar | 291 |
| Baking powder [1] | 14 |
| Salt | 7 |
| Milk solids (non-fat) | 15.6 |
| Covo [2] | 100 |
| Egg whites | 113 |
| Water | 202 |

[1] Standard baking powder is used here, i.e., of the double action variety comprising corn starch, sodium bicarbonate, calcium acid phosphate and sodium aluminum sulfate.
[2] Covo is the registered trademark name of the Procter & Gamble Co. for a plastic all-purpose vegetable shortening agent.

The first five ingredients in the above list are blended together for three minutes at the No. 1 speed in a Hobart Kitchenaid mixer. This is then followed by the addition of the shortening, egg whites and water to the mix in one batch followed by the agitation of the whole at No. 2 speed for 1.5 minutes, stopping only after each half-minute to scrape down the bowl. The batter is then checked for specific gravity and 425 grams of same is then scaled into an 8-inch round cake pan. The baking is done at 375° F. for twenty-six minutes.

This entire procedure is then repeated again using sodium N-stearoyl-DL-α-alanine at both the 0.5% and 1% concentration levels, based on flour weight. The sodium N-setaroyl-DL-α-alanine is dry-blended with the cake flour at the start of the procedure in each instance. The results obtained show that the treated cake samples, as in the case of bread, are consistently superior to the negative control, as regards both the firmness retarding effect and the dough improver qualities as well.

What is claimed is:
1. A composition of matter comprising flour in intimate admixture with at least about 0.1% by weight based on the weight of said flour of a compound selected from the group consisting of the sodium, potassium and calcium salts of N-alkanoylglycines and alanines containing from 14 to 20 carbon atoms in the alkanoyl group.

2. A composition as claimed in claim 1 wherein the amount of compound present in the mixture is from between about 0.1% up to about 3% by weight based on the weight of said flour.

3. The composition of claim 1 wherein said compound is sodium N-stearoylalanine.

4. The composition of claim 1 wherein said compound is sodium N-palmitoylalanine.

5. An aqueous farinaceous dispersion having included therein at least about 0.1% by weight based on the weight of the farinaceous ingredient, of a compound selected from the group consisting of the sodium, potassium and calcium salts of N-alkanoylglycines and alanines containing from 14 to 20 carbon atoms in the alkanoyl group.

6. A baked leavened dough product having included therein from about 0.1% up to about 3% by weight, based on the weight of the flour contained in said dough, of a compound selected from the group consisting of the sodium, potassium and calcium salts of N-alkanoylglycines and alanines containing from 14 to 20 carbon atoms in the alkanoyl group.

References Cited

UNITED STATES PATENTS 3,111,409  11/1963  Jackson et al. _____ 99—91

FOREIGN PATENTS 652,006  4/1951  Great Britain.

RAYMOND N. JONES, *Primary Examiner.*